(12) United States Patent
Yu et al.

(10) Patent No.: US 10,668,781 B2
(45) Date of Patent: Jun. 2, 2020

(54) VEHICLE SUSPENSION SYSTEM INCLUDING A BALL JOINT ASSEMBLY

(71) Applicant: Honda Motor Co., Ltd., Tokyo (JP)

(72) Inventors: Jinghong Yu, Dublin, OH (US);
Andrew John Fox, Powell, OH (US);
Takahiro Echigo, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 15/884,609

(22) Filed: Jan. 31, 2018

(65) Prior Publication Data

US 2019/0232746 A1 Aug. 1, 2019

(51) Int. Cl.
| | |
|---|---|
| *B60G 7/00* | (2006.01) |
| *B60G 17/015* | (2006.01) |
| *B60G 17/016* | (2006.01) |
| *F16C 11/00* | (2006.01) |

(52) U.S. Cl.
CPC ............ *B60G 7/005* (2013.01); *B60G 17/015* (2013.01); *B60G 17/016* (2013.01); *F16C 11/00* (2013.01); *B60G 2204/416* (2013.01); *B60G 2204/424* (2013.01)

(58) Field of Classification Search
CPC .................. B60G 7/005; B60G 17/015; B60G 2204/416; B60G 2204/424
See application file for complete search history.

(56) References Cited

U.S. PATENT DOCUMENTS

| | | | |
|---|---|---|---|
| 4,986,689 A | 1/1991 | Drutchas | |
| 6,164,860 A * | 12/2000 | Kondo | B62D 7/22 280/93.51 |
| 6,533,490 B2 * | 3/2003 | Kincaid | B60G 7/005 403/133 |
| 7,063,480 B2 | 6/2006 | Ersoy et al. | |
| 7,083,356 B2 | 8/2006 | Paduano | |
| 7,086,802 B2 * | 8/2006 | Larson | B62D 7/228 403/122 |
| 7,405,557 B2 * | 7/2008 | Spratte | B60G 7/005 324/207.22 |
| 7,695,212 B2 | 4/2010 | Spratte et al. | |
| 7,775,138 B2 | 8/2010 | Okamoto et al. | |
| 8,682,532 B2 | 3/2014 | Yu | |

(Continued)

FOREIGN PATENT DOCUMENTS

| | | |
|---|---|---|
| DE | 10148426 C5 | 8/2008 |
| EP | 2222971 B1 | 3/2011 |

(Continued)

*Primary Examiner* — Drew J Brown
(74) *Attorney, Agent, or Firm* — Armstrong Teasdale LLP

(57) ABSTRACT

A ball joint assembly for use in a vehicle suspension system includes a housing including a first end surface and an opposing second end surface. The housing at least one of includes an outer tie rod of a steering assembly and is configured to be coupled to the outer tie rod of the steering assembly. The housing defines a cavity and also includes an opening defined in the second end surface. The ball joint assembly also includes a ball stud coupled to the housing such that a first portion of the ball stud is positioned in the cavity and a second portion of the ball stud extends through the opening. A wire harness is coupled to the first end surface of the housing and extends away from the housing in a direction opposite the second end surface.

19 Claims, 8 Drawing Sheets

(56) References Cited

U.S. PATENT DOCUMENTS

| | | | |
|---|---|---|---|
| 8,753,032 B2* | 6/2014 | Yu | F16C 11/06 |
| | | | 280/93.511 |
| 9,464,663 B2 | 10/2016 | Belleau et al. | |
| 2008/0315867 A1* | 12/2008 | Spratte | F16C 11/0604 |
| | | | 324/207.13 |
| 2009/0103974 A1* | 4/2009 | Dendis | B62D 7/18 |
| | | | 403/135 |
| 2011/0153157 A1* | 6/2011 | Klank | B60G 7/005 |
| | | | 701/37 |
| 2014/0212204 A1 | 7/2014 | Belleau et al. | |
| 2017/0247039 A1 | 8/2017 | Yu | |

FOREIGN PATENT DOCUMENTS

| | | |
|---|---|---|
| GB | 1479606 A | 7/1977 |
| JP | H0930226 A | 2/1997 |
| JP | 2002310207 A | 10/2002 |
| JP | 2004082980 A | 3/2004 |
| JP | 2009173057 A | 8/2009 |

* cited by examiner

VEHICLE SUSPENSION SYSTEM INCLUDING A BALL JOINT ASSEMBLY

BACKGROUND

The present disclosure relates generally to vehicle suspension systems and, more specifically, to vehicle suspension systems having a ball joint assembly.

At least some known vehicle suspension systems include ball joint assemblies that include friction control devices that can be selectively varied in operation between a nominal friction mode and an increased friction mode to affect vehicle performance. The friction control devices are coupled to a controller via a wire harness that is routed through the suspension system. At least some known ball joint assemblies are coupled to a portion of a wheel knuckle and extend in a downward direction. The wire harness also extends from the ball joint assembly in a downward direction toward the ground surface. In such a configuration, the wire harness is susceptible to an undesired amount of movement within the vehicle environment during suspension stroking and/or steering input. Such motion may result in decoupling of the wire harness from the ball joint assembly. Accordingly, a need exists for a system and method to inhibit or prevent or minimize motion of the wire harness in the vehicle environment during suspension stroking and/or steering input.

BRIEF SUMMARY

In one aspect, a ball joint assembly for use in a vehicle suspension system is provided. The ball joint assembly includes a housing including a first end surface and an opposing second end surface. The housing defines a cavity and also includes an opening defined in the second end surface. The ball joint assembly also includes a ball stud coupled to the housing such that a first portion of the ball stud is positioned in the cavity and a second portion of the ball stud extends through the opening. A wire harness is coupled to the first end surface of the housing and extends away from the housing in a direction opposite the second end face.

In another aspect, a vehicle is provided. The vehicle includes a wheel, a knuckle coupled to wheel, wherein the knuckle includes an arm portion having a top surface and a bottom surface, and a ball joint assembly coupled to the arm portion. The ball joint assembly includes a housing positioned proximate the top surface of the arm portion. The housing includes a first end surface, an opposing second end surface, and an opening defined in the second end surface, and wherein the housing defines a cavity. The ball joint assembly includes a ball stud coupled to the housing such that a first portion of the ball stud is positioned in the cavity and a second portion of the ball stud extends through the opening and into an aperture defined in the arm portion. The ball joint assembly further includes a wire harness coupled to the first end surface of the housing and extending away from the housing in a direction opposite the arm portion.

DETAILED DESCRIPTION

The systems and methods described herein relate generally to vehicle suspension systems and, more specifically, to vehicle suspension systems having a ball joint assembly that inhibits or prevents or minimizes motion the rocking motion of the ball joint assembly and the of a wire harness in the vehicle environment during suspension stroking and/or steering input.

The vehicle described herein includes a wheel knuckle having an arm portion with top and bottom surfaces and a ball joint assembly coupled to the arm portion. The ball joint assembly includes a housing coupled to the top surface of the arm portion, and a wire harness coupled to a top surface of the housing and extending away from the housing in an upward direction opposite the arm portion. As such, the ball joint assembly is mounted to the top of the arm portion of the knuckle such that the wire harness extends from a top surface of the ball joint housing rather than from a bottom surface. Accordingly, the wire harness is less susceptible to movement during suspension stroking and/or steering input and the risk for wire harness decoupling from the ball joint housing is reduced or eliminated.

At least some known vehicle suspension systems include ball joint assemblies that include friction control devices that can be selectively varied in operation between a nominal friction mode and an increased friction mode to affect vehicle performance. The friction control devices are coupled to a controller via a wire harness that is routed through the suspension system. At least some known ball joint assemblies are coupled to a portion of a wheel knuckle and extend in a downward direction. The wire harness also extends from the ball joint assembly in a downward direction toward the ground surface. In such a configuration, the wire harness is susceptible to an undesired amount of movement within the vehicle environment during suspension stroking and/or steering input. Such motion may result in decoupling of the wire harness from the ball joint assembly. Accordingly, a need exists for a system and method to inhibit or prevent or minimize the rocking motion of the ball joint assembly and the motion of the wire harness in the vehicle environment during suspension stroking and/or steering input.

Figure 1:
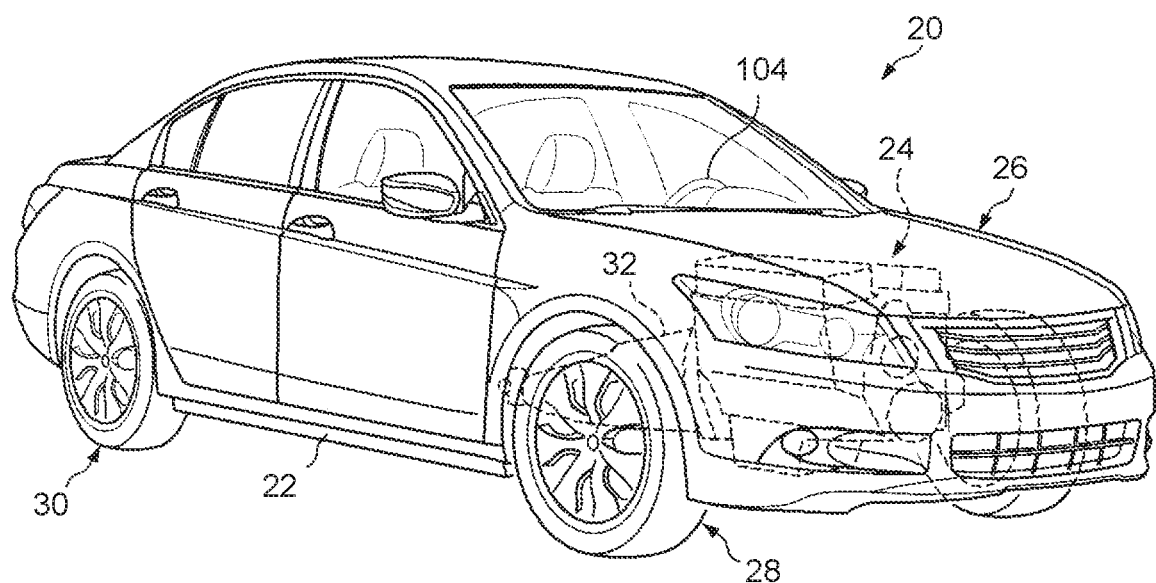
FIG. 1 is a right front perspective view of an exemplary vehicle that includes a suspension system.

FIG. 1 is a right front perspective view of an exemplary vehicle 20. In the exemplary embodiment, vehicle 20 is an automobile. In other embodiments, vehicle 20 may be any of a variety of other suitable vehicles, such as a recreational vehicle or a utility vehicle, for example. In the exemplary embodiment, vehicle 20 includes a frame 22 and an engine 24. Engine 24 is mounted within an engine compartment 26. Front wheels (e.g., 28) and rear wheels (e.g., 30) are rotatably coupled with frame 22. Vehicle 20 includes a transmission 32 that couples engine 24 with one or more of the wheels (e.g., 28, 30) of vehicle 20. Transmission 32 is coupled to engine 24 such that power from engine 24 is transmitted through transmission 32, to a drivetrain (not shown), and to the wheels (e.g., 28, 30) to propel vehicle 20. The transmission 32 can be operable in any of a plurality of gears (not shown) to facilitate operation of vehicle 20 at different speeds.

Vehicle 20 includes an accelerator pedal (not shown) that is selectively movable (e.g., with an operator's foot) to facilitate operation of vehicle 20 at different speeds. In other embodiments, vehicle 20 can include a hand-operated throttle or any of a variety of other suitable throttle devices that are movable to facilitate selective acceleration of vehicle 20.

Figure 2:
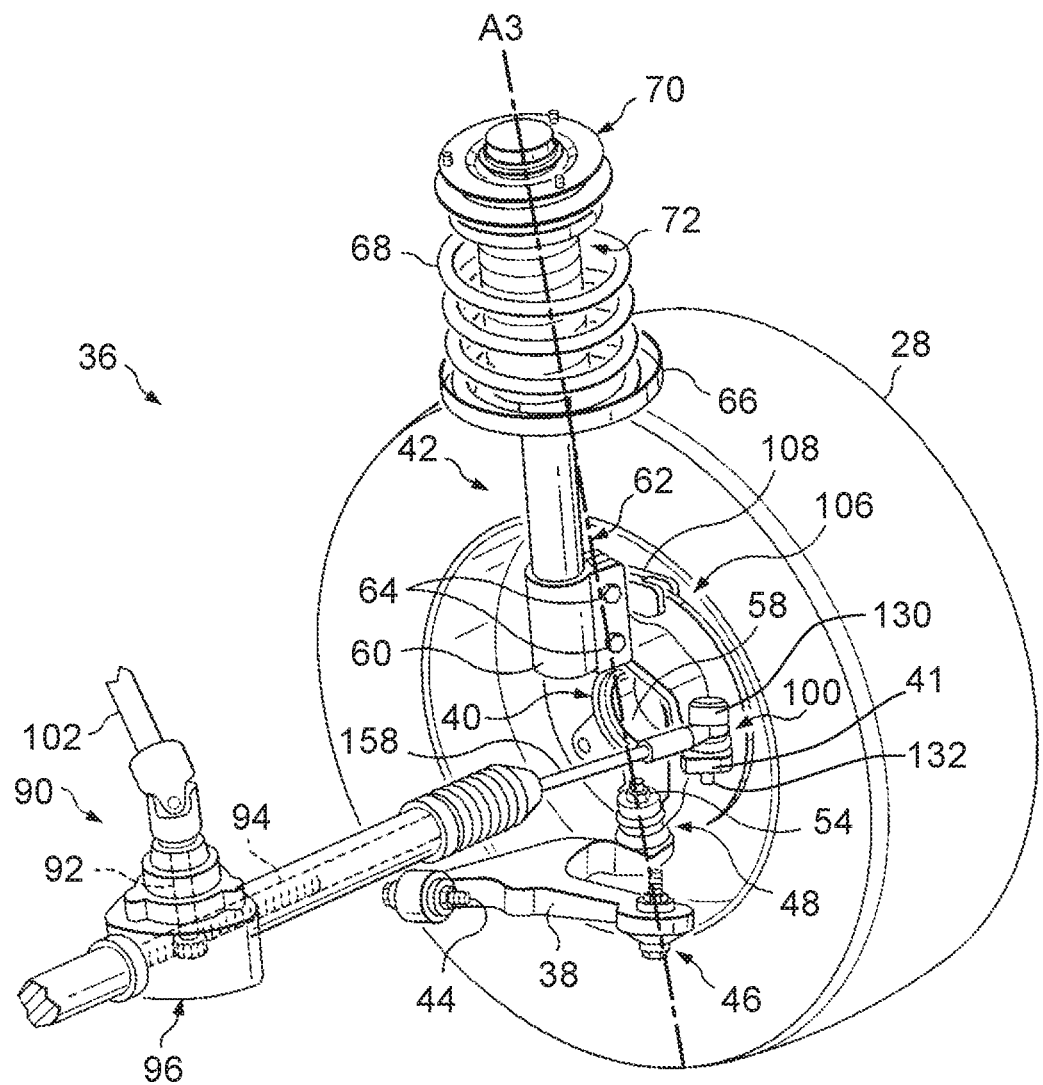
FIG. 2 is a right front perspective view of a portion of the suspension system of FIG. 1, wherein certain components of the vehicle have been omitted for clarity.

As illustrated in FIG. 2, vehicle 20 includes a suspension system 36 including a support arm 38, a wheel knuckle 40, and a suspension damper 42 that cooperate to rotatably support one of front wheels 28 with respect to frame 22. In the exemplary embodiment, support arm 38 includes a bolt 44 and a frame ball joint 46 or bushing that facilitate pivotal coupling of support arm 38 to frame 22. In other embodiments, a support arm can be configured in any of a variety of suitable alternative arrangements that facilitate its pivotal coupling with a frame of a vehicle.

As illustrated in FIG. 2, wheel knuckle 40 is coupled with support arm 38 by a lower control arm ball joint 48. Furthermore, wheel knuckle 40 defines a bearing hub 58 supports a bearing (e.g., in a press fit arrangement) to facilitate rotatable support of an axle shaft (not shown) with respect to wheel knuckle 40. A wheel hub (not shown) is coupled with the axle shaft (e.g., in a splined arrangement) and supports one of front wheels 28 with lugs (not shown).

Wheel knuckle 40 is coupled with suspension damper 42. As illustrated in FIG. 2, wheel knuckle 40 includes a suspension bracket 60 that is provided in a split clamp-type arrangement. A lower end 62 of suspension damper 42 is inserted into suspension bracket 60 and releasably coupled with bolts 64. Suspension damper 42 includes a spring flange 66 that provides underlying support for a spring 68. A strut bearing 70 overlies spring 68 and interfaces with an upper end 72 of suspension damper 42. Strut bearing 70 includes threaded stems (not shown) that facilitate coupling of upper end 72 of suspension damper 42 with a portion of frame 22 that resides above front wheels 28 (e.g., above a wheel well).

Lower control arm ball joint 48 and strut bearing 70 cooperate to facilitate pivoting of wheel knuckle 40 about the king pin axis A3. During operation of vehicle 20, support arm 38 pivots with respect to frame 22 to accommodate vertical movement of front wheel 28. Suspension damper 42 dampens the shock impulses imparted to support arm 38 that might otherwise affect the overall comfort of vehicle 20. It will be appreciated that a support arm and/or wheel knuckle may be provided in any of a variety of suitable alternative arrangements that facilitate rotatable support of a wheel with respect to a frame. For example, a vehicle can include an upper support arm and a lower support arm that can each be pivotably coupled with a frame of a vehicle (e.g., with bolts). Each of the upper and lower support arms may be coupled to the wheel knuckle with ball joints.

Figure 3:
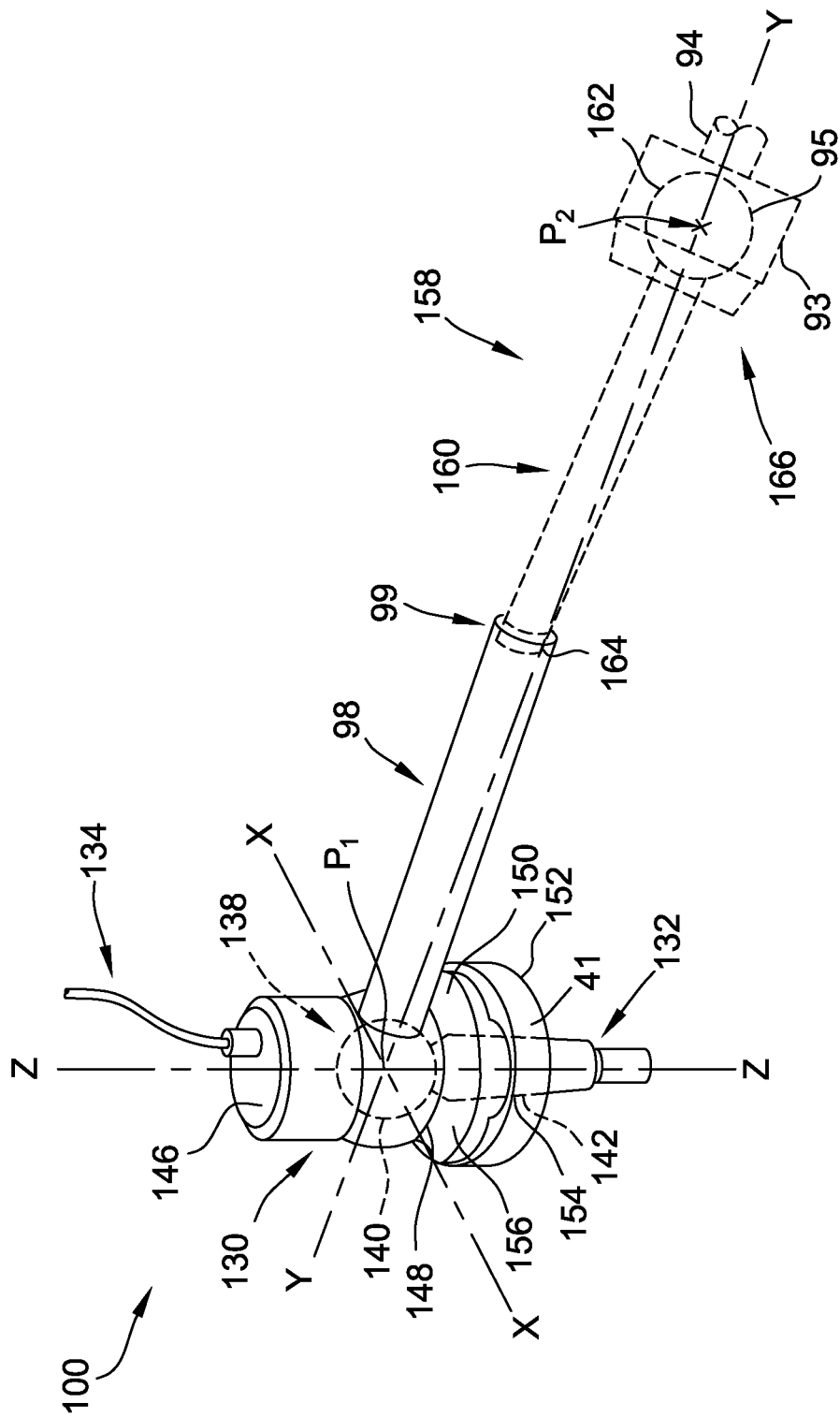
FIG. 3 is a schematic view of an exemplary ball joint assembly that may be used with the suspension system shown in FIG. 2.

Referring to FIG. 2 and FIG. 3, vehicle 20 includes a steering assembly 90 that facilitates steering of vehicle 20. In the exemplary embodiment, steering assembly 90 includes a rack and pinion steering arrangement including a pinion shaft 92, a rack 94, a steering rack guide 96, and an inner tie rod assembly 158. Pinion shaft 92 and rack 94 are coupled together with intermeshing gear surfaces (not shown) located at steering rack guide 96. Inner tie rod assembly 158 comprises an inner tie rod 160 and an inner tie rod housing 93. Inner tie rod 160 has a ball portion 162 at one end and a threaded portion 164 at the other end, and inner tie rod housing 93 has a cavity 95 which receives ball portion 162 to form an inner tie rod ball joint 166, wherein inner tie rod 160 is pivotable with respect to inner tie rod housing 93 about a point P2. Inner tie rod assembly 158 extends from rack 94 and is coupled with wheel knuckle 40 via a ball joint assembly 100. More specifically, wheel knuckle 40 includes a steer arm, or an arm portion 41 on top of which ball joint assembly 100 is coupled such that ball joint assembly 100 extends upwards, away from the ground, from arm portion 41.

A steering shaft 102 operably couples a steering wheel (104 in FIG. 1) and pinion shaft 92 together. Operation of steering wheel 104 (e.g., to steer vehicle 20) moves inner tie rod 160 to pivot wheel knuckle 40 leftwardly and rightwardly about the king pin axis A3. Ball joint assembly 100 facilitates pivoting of wheel knuckle 40 with respect to inner tie rod 160 during steering of vehicle 20. As described in further detail below, ball joint assembly 100 includes a housing 130 coupled to inner tie rod 160, a ball stud 132 coupled to wheel knuckle 40, and a harness 134 (not shown in FIG. 2 for clarity) coupled to housing 130. In further detail, housing 130 has an extended portion—an outer tie rod 98, which is coupled with inner tie rod 160 through a threaded end 99 of outer tie rod 98 and threaded portion 164 of inner tie rod 160. As described herein, ball joint assembly 100 is coupled to a controller (not shown), via harness 134, to utilize active friction control to vary the ease of movement of ball joint assembly 100 within vehicle suspension system 36. More specifically, the controller facilitates variation in operation of ball joint assembly 100 between a first friction mode and a second, increased friction mode.

Although suspension system 36 is illustrated with respect to a left front wheel (e.g., 28), a suspension system can be provided in a similar arrangement for any of the wheels (e.g., 28, 30) of vehicle 20. In some embodiments, a wheel knuckle can include a non-steerable-type knuckle such as when the wheel knuckle is associated with one of rear wheels 30.

Figure 4:
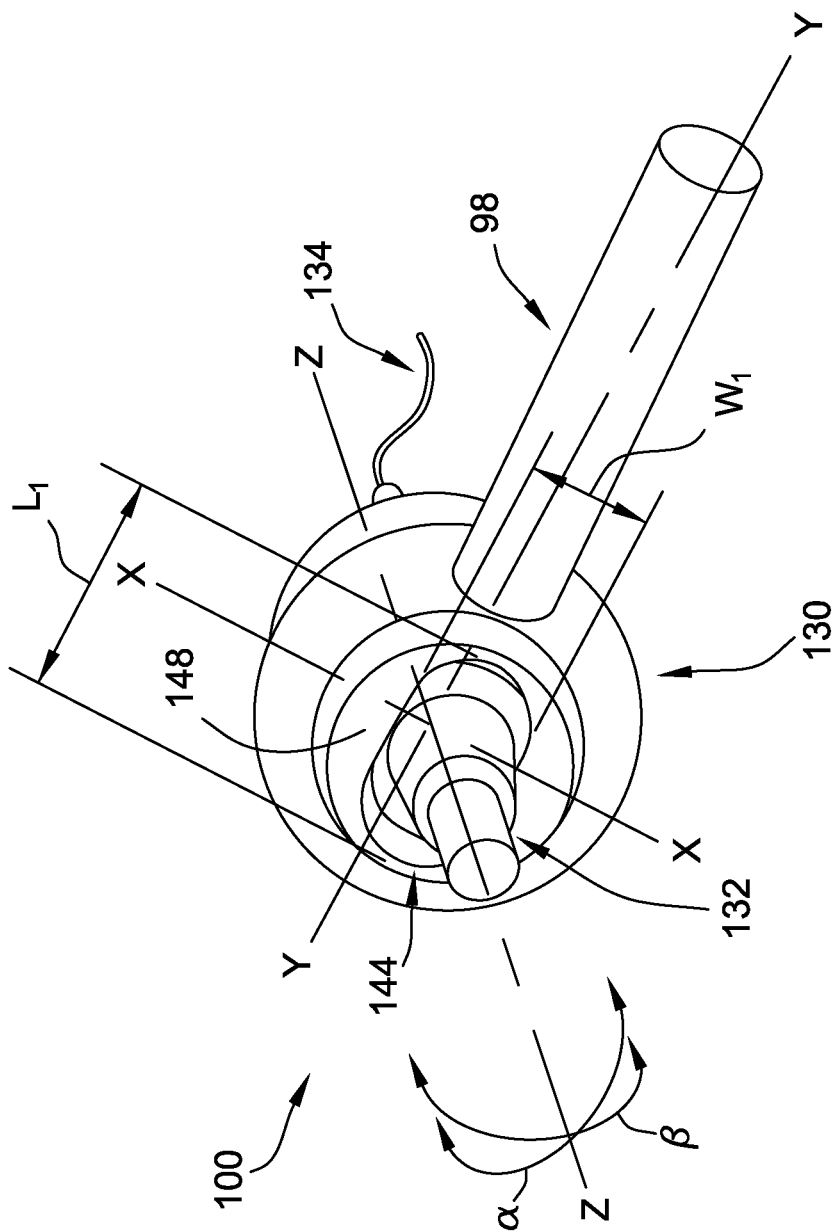
FIG. 4 is another schematic view of the ball joint assembly shown in FIG. 3.

FIG. 3 is a schematic view of ball joint assembly 100, and FIG. 4 is another schematic view of ball joint assembly 100. In the exemplary embodiment, ball joint assembly 100 includes housing 130 and ball stud 132. More specifically, housing 130 defines a cavity 138 therein and a first portion, a ball portion 140 of ball stud 132 is positioned within cavity 138. A second portion, a shank portion 142, of ball stud 132 extends from ball portion 140 through an opening 144 (shown in FIG. 4) defined by housing 130 and extends downward to couple to arm portion 41. In the exemplary embodiment, ball stud 132 is engaged with housing 130 in a spheroid-type arrangement such that ball stud 132 is pivotable with respect to housing 130 about a point P1 (e.g., about axes x, y, and z) and is rotatable about a Z-axis that extends along shank portion 142, as illustrated in FIG. 3.

Referring to FIGS. 3 and 4, housing 130 includes a first end surface, or top surface 146, and an opposing second end surface, or bottom surface 148. Opening 144 is defined in second end surface 148 such that shank portion 142 of ball stud 132 extends through opening 144 away from first end surface 146. As described herein, wire harness 134 is coupled to first end surface 146 proximate the Z-axis and extends away from housing 130 in a direction substantially opposite second end surface 148. Coupling wire harness 134 to first end surface 146 of housing 130 minimizes motion of wire harness 134 in the vehicle environment during suspension stroking and/or steering input. More specifically, wire harness 134 directs the wires therein in a direction aligned with the Z-axis, which is where the motion of wire harness 134 is the lowest during suspension stroking and/or steering input, that minimizes movement or bending of the wires and/or wire harness 134. In the exemplary embodiment, wire harness 134 is integrally formed (e.g., molded) with first end surface 146. In another embodiment, wire harness 134 is coupled to first end surface 146 using a coupling or other attachment mechanism.

In the exemplary embodiment, wire harness 134 includes power supply wires and signal wires that are used to control the ball joint assembly 100. More specifically, ball joint assembly 100 includes a friction control device that is configured such that a friction resistance force between housing 130 and ball stud 132 may be selectively varied to change the freedom of movement between housing 130 and ball stud 132. In the event of relative movements of ball stud 132 relative to housing 130 owing to intended rotational or pivoting movements, friction arises between the surface of ball stud 132 and housing 130. This friction subjects the movement of ball stud 132 relative to housing 130 to a resistance. The friction control device is able to change the friction resistance force between housing 130 and ball stud 132. For various reasons, in the case of ball joints for certain applications, there is a demand to be able to actively influence the friction resistance of the ball joint. In terms of construction, this may be realized for example by virtue of the joint housing comprising two housing parts which are movable relative to one another and which engage in the manner of jaws on opposite sides of the joint ball, wherein at least one of the two housing parts can be moved in order to thereby clamp the joint ball to a varying degree between the housing parts that are movable relative to one another. Depending on the pressure exerted on the joint ball, it is possible in this way to actively influence the friction resistance of the ball joint.

The power supply wires and signal wires of wire harness 134 communicatively couple the friction control device of ball joint assembly 100 to a controller that controls operation of the friction control device. In operation, wire harness 134 is configured to receive control signals from the controller to cause the friction control device to change a friction resistance force between ball stud 132 and housing 130. More specifically, ball joint assembly 100 may be selectively varied in operation between a first friction mode and a second, increased friction mode. As ball joint assembly 100 changes operation from the first friction mode to the second, increased friction mode, the friction resistance force between housing 130 and ball stud 132 increases, which makes movement of ball stud 132 with respect to housing 130 increasingly difficult.

As best shown in FIG. 3, ball joint assembly 100 is coupled to arm portion 41 of wheel knuckle 40. In the exemplary embodiment, arm portion includes a top surface 150, a bottom surface 152, and an aperture 154 defined therethrough that is substantially aligned with the Z-axis. As shown in FIG. 3, ball joint assembly 100 is coupled to top surface 150 of arm portion 41 such that housing 130 is positioned proximate top surface 150 and shank portion 142 of ball stud 132 extends downwards through aperture 154. Specifically, ball joint assembly 100 includes a sealing boot 156 coupled between housing 130 and arm portion 41. More specifically, sealing boot 156 is coupled to second end surface 148 of housing 130 and top surface 150 of arm portion 41. Shank portion 142 extends through sealing boot 156 and through aperture 154 in arm portion 41. In one embodiment, ball stud 132 is coupled to arm portion 41 in a press-fit arrangement or with a circlip and shank portion 142 includes a threaded stem that is coupled to arm portion 41 with a nut (not shown). However, in other embodiments, ball joint assembly 100 can be coupled arm portion 41 of wheel knuckle 40 in any of a variety of suitable alternative arrangements.

A Y-axis extends through point P1 in ball portion 140 of ball stud 132 and point P2 in inner tie rod ball joint 166. The Z-axis extends in the direction of ball stud 132. Furthermore, the X-axis of ball joint assembly 100 is perpendicular to both the Z-axis and the Y-axis and extends through point P1 in ball portion 140 of ball stud 132. In the exemplary embodiment, outer tie rod 98 extends from housing 130 substantially along the Y-axis.

As best shown in FIG. 4, in which sealing boot 156 is removed for clarity, opening 144 in second end surface 148 includes a length L1 and a width W1 that is different from the length L1 such that opening 144 defines a different range of motion of ball stud 132 along the length L1 than along the width W1 of opening 144. More specifically, the length L1, extending along the Y-axis, is greater than the width W1, which extends along the X-axis. As such, in the exemplary embodiment, opening 144 in second end surface 148 is one of substantially oval-shaped, elliptical, or rectangular. Alternatively, opening 144 includes any shape that facilitates operation of ball joint assembly 100 as described herein. Generally, opening 144 includes any shape that enables ball stud 132 to have a larger range of motion along one axis than along a perpendicular axis. In the exemplary embodiment, opening 144 defines a first rocking angle $\alpha$ of ball stud 132 about the X-axis, that is, along the Y-axis. Similarly, opening 144 defines a second rocking angle $\beta$ of ball stud 132 about the Y-axis, that is, along the X-axis. As described herein, in the exemplary embodiment, first rocking angle $\alpha$ about the X-axis is greater than the second rocking angle $\beta$ about the Y-axis. For example, first rocking angle $\alpha$ is within a range of approximately 25 degrees to approximately 50 degrees, and second rocking angle $\beta$ is within a range of approximately 1 degree to approximately 5 degrees. Therefore, in the vehicle environment, the rocking of housing 130 of ball joint assembly 100 is substantially limited in the longitudinal direction of the vehicle.

Figure 5:
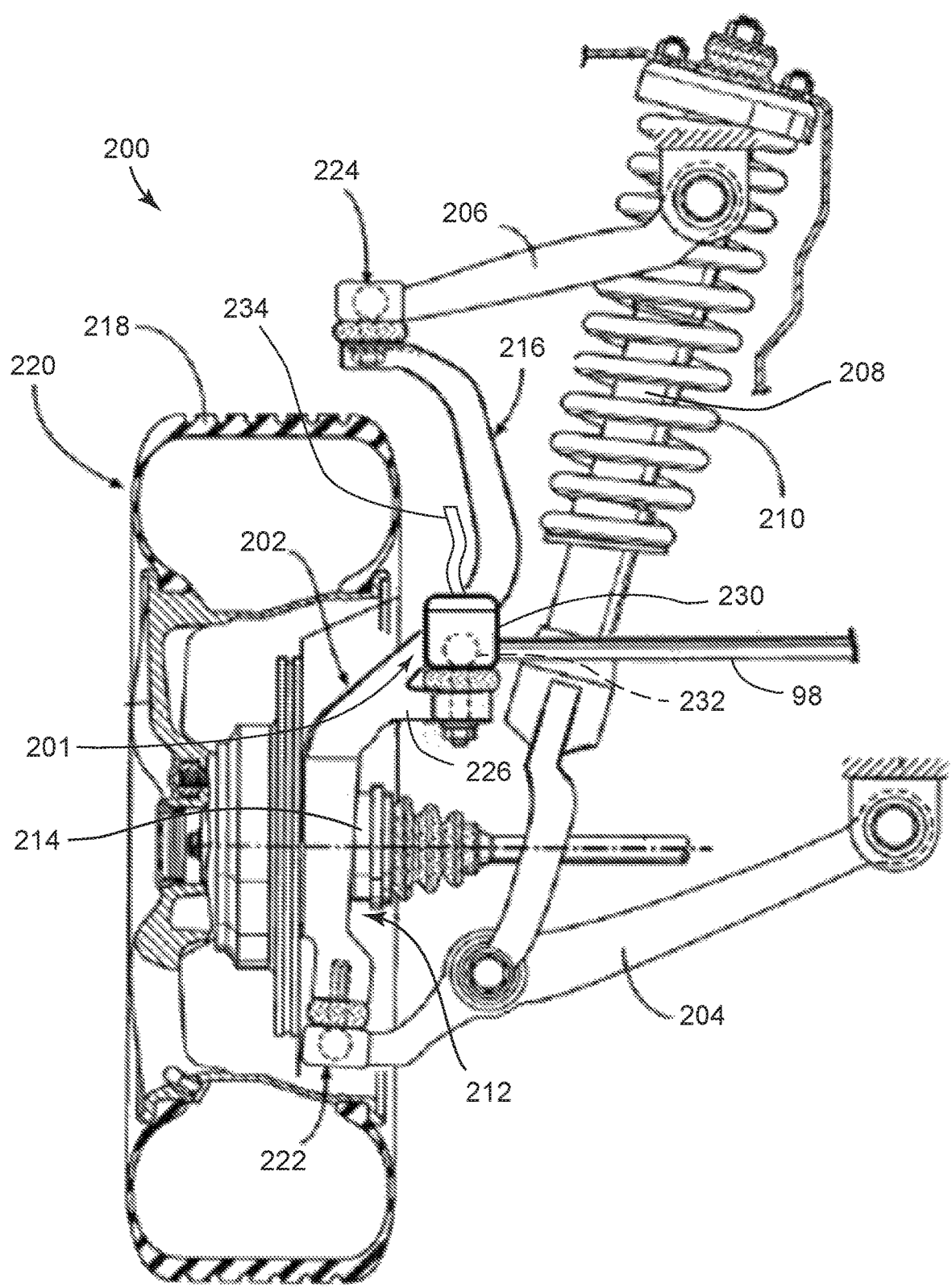
FIG. 5 is a rear view of a portion of an alternative suspension system that may be used with the vehicle of FIG. 1 illustrating the ball joint assembly of FIG. 3.

FIG. 5 is a rear view of a portion of an alternative suspension system 200 that may be used with the vehicle of FIG. 1 illustrating the ball joint assembly 100. In other embodiments, vehicle 20 may include a suspension system having a configuration different than suspension system 36 shown in FIG. 2. For example, FIG. 5 is a rear view of another exemplary embodiment of a suspension system 200 that may be used with vehicle 20. Suspension system 200 illustrated in FIG. 5 is a double wishbone suspension that includes a knuckle 202, a lower control arm 204, an upper control arm 206, a hydraulic damper 208, and a suspension spring 210. Knuckle 202 includes a knuckle main body portion 212 for rotatably supporting an axle 214 via a ball bearing, and first arm portion 216 extending upward from knuckle main body portion 212 over a tire 218 of front wheel 220. A lower control arm ball joint 222 is received within a ball bearing support hole defined in knuckle main body portion 212. Lower control arm ball joint 222 pivotably supports the extremity of lower control arm 204. An upper control arm ball joint 224 is mounted on an upper end of arm portion 216. Upper control arm ball joint 224 pivotally supports the extremity of upper control arm 206.

In the embodiment of FIG. 5, wheel knuckle 202 also includes a second arm portion 226 that supports and is coupled to a ball joint assembly 201, which may have the same configuration as ball joint assembly 100 described above with reference to FIGS. 1-4. In some embodiments, for example, ball joint assembly 201 includes a friction control device that is configured such that a friction resistance force between components of ball joint assembly 201 may be selectively varied to change the freedom of movement between the components. In such embodiments, ball joint assembly 201 includes a housing 230 substantially similar to housing 130, a ball stud 232 substantially similar to ball stud 132, and a wire harness 234 substantially similar to wire harness 134.

Figure 6:
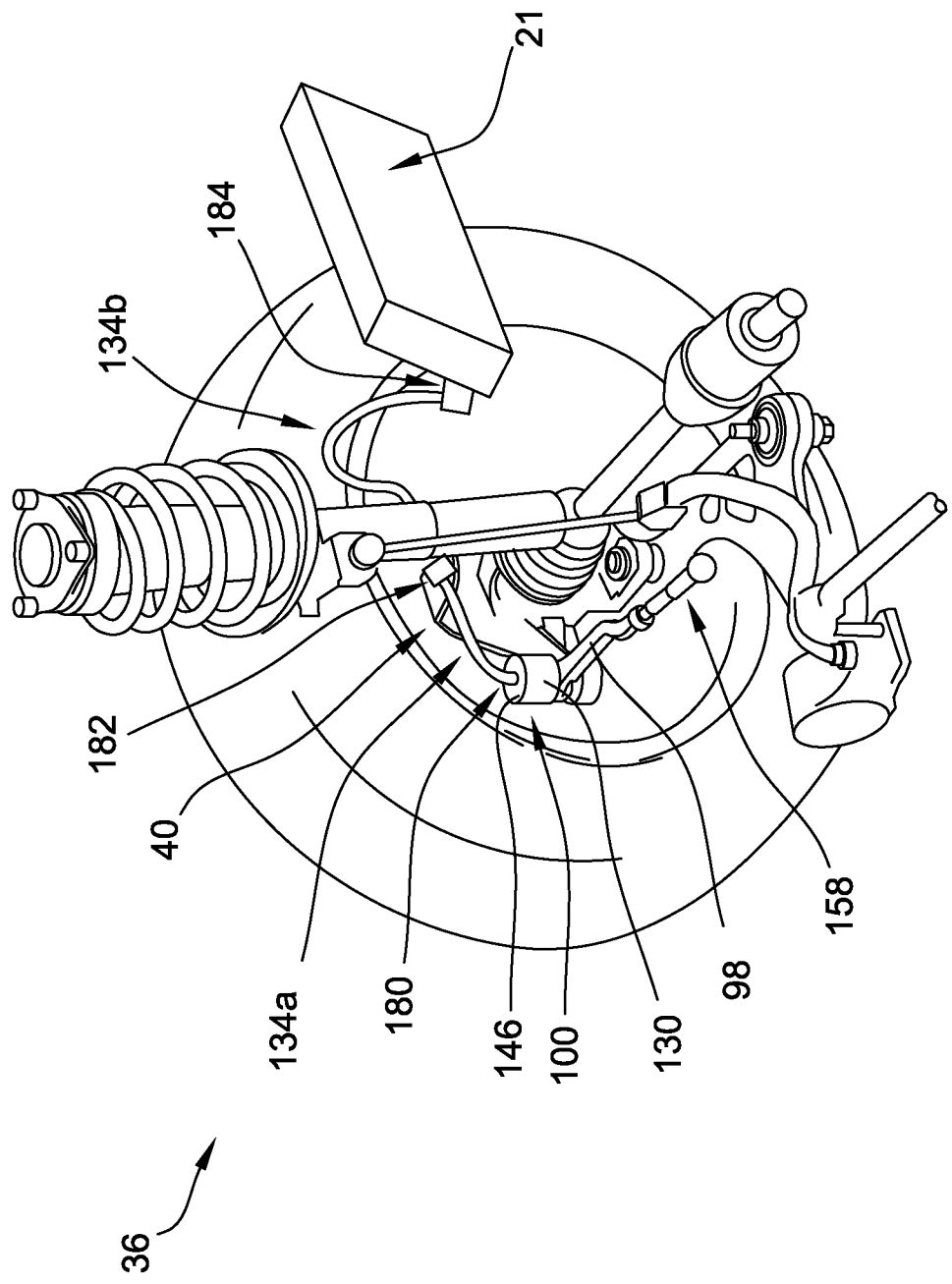
FIG. 6 is a schematic view of a portion of the suspension system shown in FIG. 2, wherein an exemplary routing of the harness of the ball joint assembly is illustrated.

FIG. 6 is a schematic view of a portion of suspension system 36 illustrating an exemplary routing of wire harness 134 of ball joint assembly 100. In the embodiment shown in FIG. 6, wire harness 134 is routed through suspension system 36 from ball joint assembly 100 to a body 21 of vehicle 20. Wire harness 134 includes a plurality of segments including at least a first segment 134a and a second segment 134b that are coupled together to route wire harness 134 between ball joint assembly 100 and body 21. More specifically, first segment 134a is coupled at one end to first end surface 146 of housing 130 at a harness attachment point 180. First segment 134a extends from attachment point 180 to a first attachment mechanism 182 coupled to wheel knuckle 40. Second segment 134b then extends from first attachment mechanism 182 to a second attachment mechanism 184 coupled to body 21.

Figure 7:
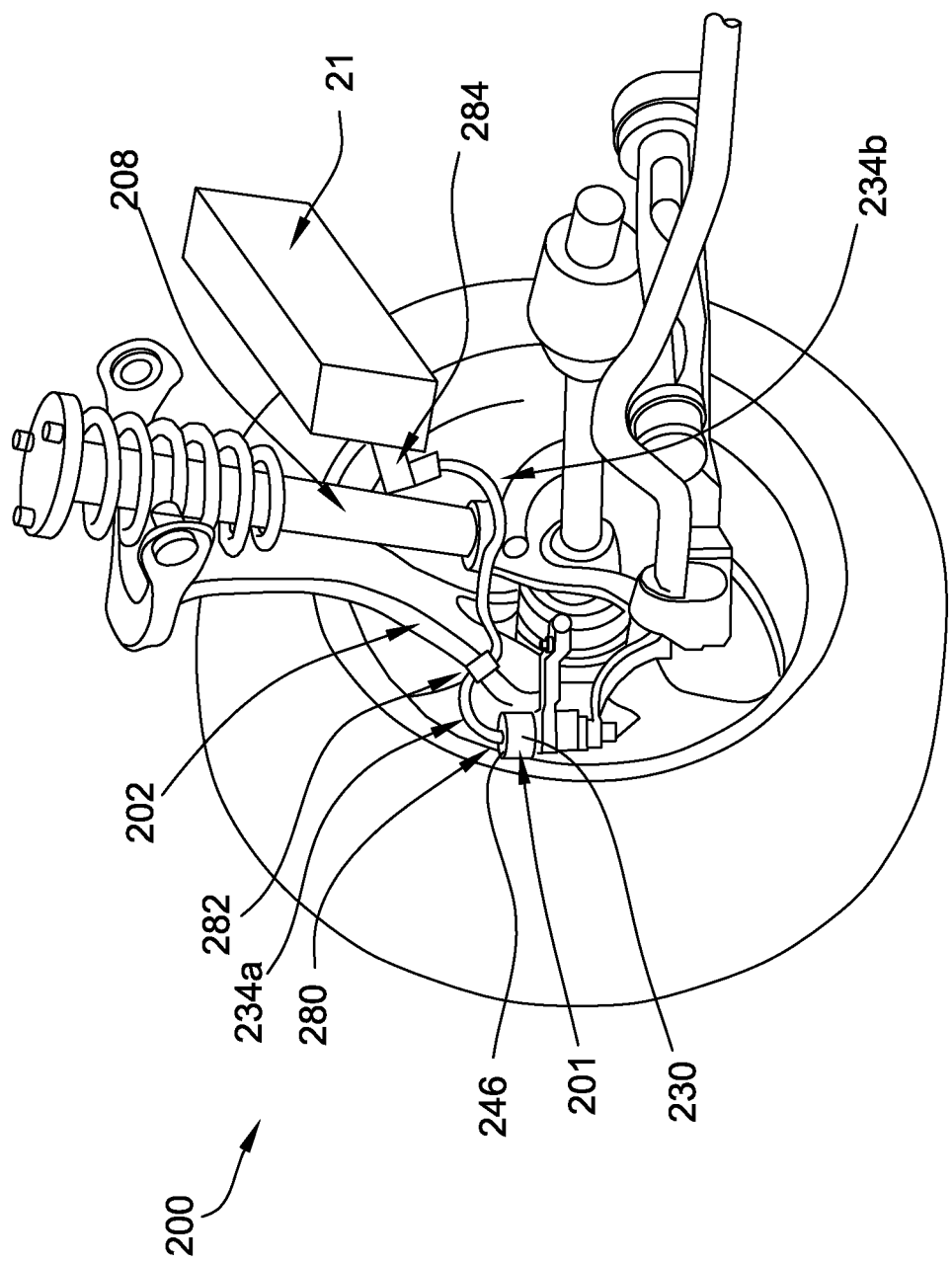
FIG. 7 is a schematic view of a portion of the suspension system shown in FIG. 5, wherein an exemplary routing of the harness of the ball joint assembly is illustrated.

FIG. 7 is a schematic view of a portion of suspension system 200 illustrating an exemplary routing of wire harness 234 of ball joint assembly 201. In the embodiment shown in FIG. 7, wire harness 234 is routed through suspension system 200 from ball joint assembly 201 to a body 21 of vehicle 20. Wire harness 234 includes a plurality of segments including at least a first segment 234a and a second segment 234b that are coupled together to route wire harness 234 between ball joint assembly 201 and body 21. More specifically, first segment 234a is coupled at one end to first end surface 246 of housing 230 at a harness attachment point 280. First segment 234a extends from attachment point 280 to a first attachment mechanism 282 coupled to wheel knuckle 202. Second segment 234b then extends from first attachment mechanism 282 to a second attachment mechanism 284 coupled to body 21.

Figure 8:
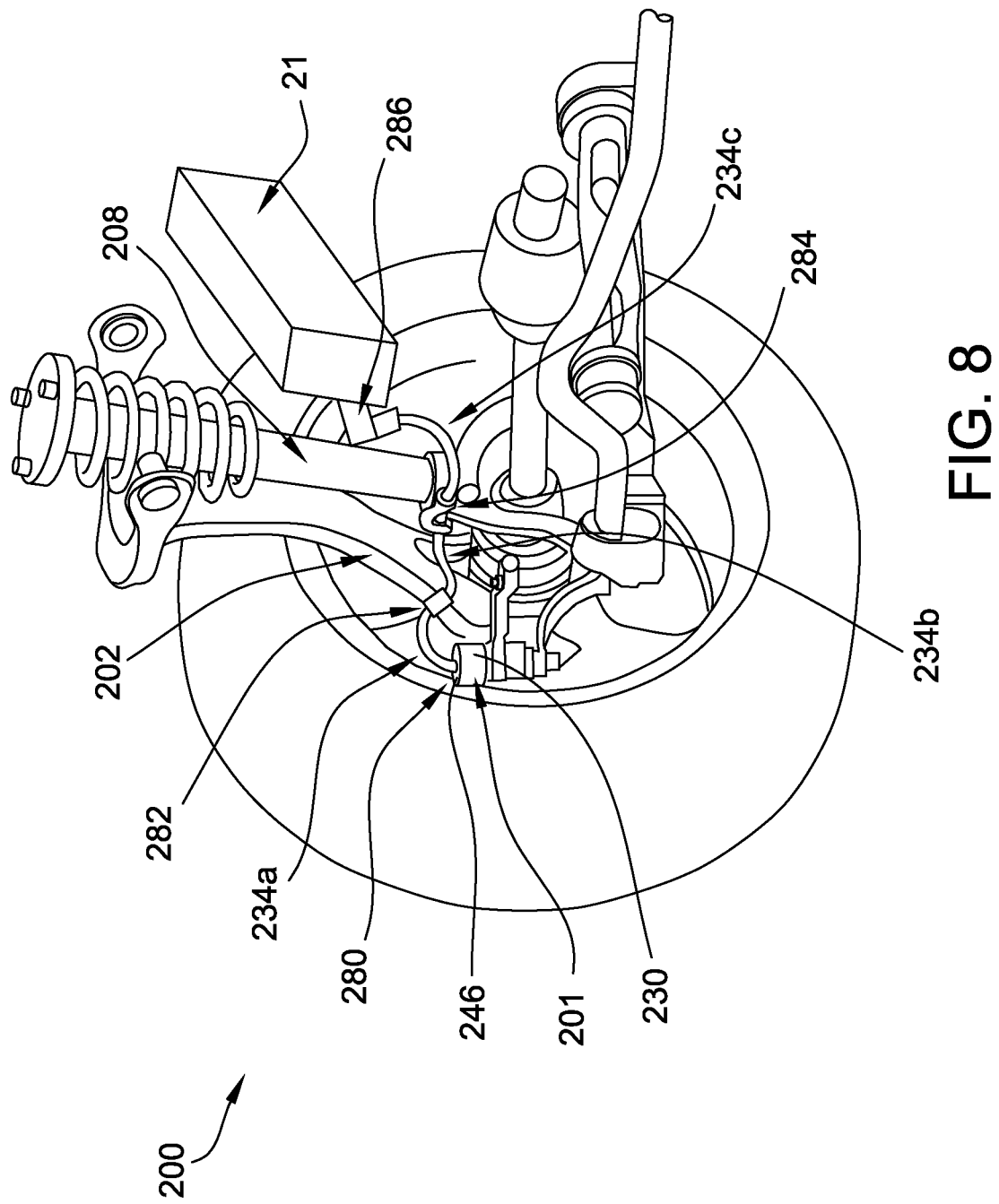
FIG. 8 is a schematic view of a portion of the suspension system shown in FIG. 5, wherein another exemplary routing of the harness of the harnessed ball joint unit is illustrated.

FIG. 8 is a schematic view of suspension system 200 illustrating another routing of wire harness 234 of ball joint assembly 201. In the embodiment shown in FIG. 8, wire harness 234 is routed through suspension system 200 from ball joint assembly 201 to a body 21 of vehicle 20. Wire harness 234 includes a plurality of segments including at least a first segment 234a, a second segment 234b, and a third segment 234c that are coupled together to route wire harness 234 between ball joint assembly 201 and body 21. More specifically, first segment 234a is coupled at one end to first end surface 246 of housing 230 at a harness attachment point 280. First segment 234a extends from attachment point 280 to a first attachment mechanism 282 coupled to wheel knuckle 202. Second segment 234b then extends from first attachment mechanism 282 to a second attachment mechanism 284 coupled to damper 208. Third segment 234c then extends from second attachment mechanism 284 to a third attachment mechanism 286 coupled to body 21.

Vehicle 20 can be susceptible to vertical motion, such as when vehicle 20 travels over a crest of a hill, for example. The vertical motion can affect the overall performance of vehicle 20 such as by reducing contact of wheels 28, 30 with a roadway, for example. In one embodiment, a controller facilitates a change in operation of a friction control device via wire harness 134 coupled to ball joint assembly 100. Ball joint assembly 100 is mounted to the top of arm portion 41 of knuckle 40 such that wire harness 134 extends from a top surface 146 of ball joint housing 130 rather than from a bottom surface. Accordingly, wire harness 134 is less susceptible to movement during suspension stroking and/or steering input and the risk for wire harness decoupling from the ball joint housing 134 is reduced or eliminated.

Exemplary embodiments of vehicle assembly systems and methods are described above in detail. The systems and methods are not limited to the specific embodiments described herein, but rather, components of the systems and/or steps of the methods may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

As used herein, an element or step recited in the singular and preceded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited feature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ball joint assembly for use in a vehicle suspension system, said ball joint assembly comprising:
   a housing comprising a top end surface and an opposing bottom end surface, said housing at least one of including an outer tie rod of a steering assembly and configured to be coupled to the outer tie rod of the steering assembly, wherein said housing defines a cavity and comprises an opening defined in said bottom end surface;
   a ball stud rotatably coupled to said housing such that a first portion of said ball stud is positioned in said cavity and a second portion of said ball stud extends through said opening, wherein said second portion is positioned below said outer tie rod assembly; and
   a wire harness coupled to said top end surface of said housing and extending away from said housing in a direction opposite said bottom end surface.

2. The ball joint assembly of claim 1, wherein said opening comprises a width and a length that is different from said width, wherein said opening enables a different range of motion of said ball stud along said width than along said length.

3. The ball joint assembly of claim 1, wherein said opening is substantially oval-shaped, elliptical, or rectangular.

4. The ball joint assembly of claim 1, wherein said first portion of said ball stud comprises a ball portion and said second portion of said ball stud comprises a shank portion.

5. The ball joint assembly of claim 4, wherein said shank portion is at least one of coupled to a steer arm of a wheel knuckle and integrally formed as a portion of the steer arm of the wheel knuckle.

6. The ball joint assembly of claim 1, further comprising a sealing boot coupled to said second end surface of said housing.

7. The ball joint assembly of claim 1, wherein said outer tie rod extends from said housing substantially along a first axis.

8. The ball joint assembly of claim 7, wherein said opening in said second end surface comprises a length extending along the first axis and a width extending along a second axis perpendicular to said first axis, wherein said length is greater than said width to facilitate a greater range of motion of said ball stud along said first axis than along said second axis.

9. The ball joint assembly of claim 1, wherein said wire harness is at least one of molded to said first end surface and coupled to said first end surface using a coupling .

10. A vehicle comprising:
a wheel;
a knuckle coupled to said wheel, wherein said knuckle comprises a steer arm portion comprising a top surface and a bottom surface;
a ball joint assembly coupled to said steer arm portion, said ball joint assembly comprising:
a housing coupled to said top surface of said steer arm portion, said housing comprising a top end surface, an opposing bottom end surface, and an opening defined in said bottom end surface, and wherein said housing defines a cavity; and
a ball stud rotatably coupled to said housing such that a first portion of said ball stud is positioned in said cavity and a second portion of said ball stud extends through said opening and into an aperture defined in said steer arm portion; and
a wire harness coupled to said top end surface of said housing and extending away from said housing in a direction opposite said steer arm portion; and
an outer tie rod coupled to said housing and extending from said housing substantially along a first axis, wherein said second portion of said ball stud and said steer arm portion are positioned below said first axis.

11. The vehicle of claim 10, further comprising a vehicle body, wherein said wire harness comprises a plurality of segments coupled to one another and extending between said housing and said vehicle body.

12. The vehicle of claim 11, further comprising a plurality of harness attachment mechanisms configured to couple a pair of adjacent harness segments of said plurality of harness segments together and to said vehicle body.

13. The vehicle of claim 10 further comprising a sealing boot coupled to said second end surface between said housing and said arm portion.

14. The vehicle of claim 10, wherein said opening in said second end surface comprises a length extending along the first axis and a width extending along a second axis perpendicular to said first axis, wherein said length is greater than said width to facilitate a greater range of motion of said ball stud along said first axis than along said second axis.

15. The vehicle of claim 10, wherein said first portion of said ball stud comprises a ball portion and said second portion of said ball stud comprises a shank portion.

16. The vehicle of claim 10, wherein said opening comprises a width and a length that is different from said width, wherein said opening enables a different range of motion of said ball stud along said width than along said length.

17. The vehicle of claim 10, further comprising a steering assembly comprising an inner tie rod assembly comprising an inner tie rod, wherein said outer tie rod is coupled to said inner tie rod such that said ball joint assembly is coupled between said steer arm portion and said inner tie rod assembly.

18. The vehicle of claim 10, wherein said wire harness communicatively couples a friction control device of said ball joint assembly to a controller that controls operation of the friction control device.

19. The vehicle of claim 18, wherein said wire harness is configured to receive control signals from the controller to cause the friction control device to change a friction resistance force between said ball stud and said housing.

* * * * *